United States Patent [19]

Seiki et al.

[11] Patent Number: 5,378,012
[45] Date of Patent: Jan. 3, 1995

[54] LID STRUCTURE OF AIR BAG SYSTEM

[75] Inventors: Kazuhiro Seiki; Yukihiro Yamaguchi; Minoru Kanda, all of Saitama, Japan

[73] Assignee: Honda Giken Kogyo Kabushiki Kaisha, Tokyo, Japan

[21] Appl. No.: 912,132

[22] Filed: Jul. 9, 1992

Related U.S. Application Data

[63] Continuation of Ser. No. 651,834, Feb. 7, 1991, abandoned.

[30] Foreign Application Priority Data

Feb. 9, 1990 [JP] Japan .................. 2-12123[U]

[51] Int. Cl.⁶ .................. B60R 21/22; B60R 21/20
[52] U.S. Cl. .................. 280/728 B; 280/732
[58] Field of Search .......... 280/732, 730, 728, 752, 280/743, 728 B

[56] References Cited

U.S. PATENT DOCUMENTS

| | | | |
|---|---|---|---|
| 4,770,439 | 9/1988 | Maier | 280/732 |
| 4,964,653 | 10/1990 | Parker | 280/732 |
| 5,035,444 | 7/1991 | Carter | 280/732 |

FOREIGN PATENT DOCUMENTS

| | | | |
|---|---|---|---|
| 3505927 | 8/1986 | Germany | 280/728 |

*Primary Examiner*—Karin L. Tyson
*Attorney, Agent, or Firm*—Armstrong, Westeman, Hattori, McLeland & Naughton

[57] ABSTRACT

A turning center line is provided at a front edge side of a lid mounted on an upper surface of an instrument panel for permitting spreading of an air bag, and the lid is provided at a rear edge side thereof with a free end which is adapted to abut against a front windshield when the lid is opened. By contructing the lid-turning center line to be substantially parallel to the widthwise line of the front windshield, and the free end of the lid to be, in its closed position, substantially parallel to a line extending in a widthwise direction of the vehicle, or by constructing the lid-turning center line to be substantially parallel to the line extending in the widthwise direction of the vehicle, and the free end of the lid to be, in its closed position, substantially symmetrical to the widthwise line of the front windshield with respect to the lid-turning central line, it is ensured that the free end of the lid is permitted to abut against the front windshield substantially concurrently over the widthwise entire length. This avoids application of a localized load to the lid, thereby preventing any deformation or breaking of the lid.

8 Claims, 8 Drawing Sheets

LID STRUCTURE OF AIR BAG SYSTEM

This application is a continuation, of application Ser. No. 651,834 filed Feb. 7, 1991, now abandoned.

BACKGROUND OF THE INVENTION

FIELD OF THE INVENTION

The field of the present invention is air bag systems of a type having an air bag which can be expanded and spread from an upper surface of an instrument panel into a compartment to hold an occupant of a seat and particularly, lid structures of a system for covering an opening in the upper surface of the instrument panel through which the air bag is spreads.

DESCRIPTION OF THE PRIOR ART

There is a conventionally known air bag system in which when a deceleration equal to or more than a given value is sensed upon colliding of a vehicle, an air bag expands and spreads into a compartment by pressure produced by an inflator, thereby holding and protecting an occupant of a seat to protect from a shock due to a secondary collision.

For an occupant of an assistant driver's seat, one such air system is Generally mounted within an instrument panel. Such air bag systems are classified into two types: a high mount type in which an air bag spreads into a compartment through an opening in a front face of the instrument panel and low mount type in which an air bag spreads into a compartment through an opening in a lower portion of the instrument panel.

Recently, air bag systems of a so-called top dash mount type have been proposed in which an air bag spreads into a compartment through an opening formed in an upper surface of an instrument panel. In this type, it is possible to more reliably protect the head of an occupant from collision against a front windowshield or the instrument panel.

In general, the air bag system of the top dash mount type comprises a lid mounted on an upper portion the instrument panel to extend in a widthwise direction of a vehicle. The lid is urged outwardly and opened by pressure generated by the air bag being expanded within the instrument panel. During this time, the lid is pivotally moved or turned about lid-turning center line defined at a front edge side of the lid to a position in which a free end of the lid at its rear edge side abuts against an inner surface of the front windshield or windshield of a vehicle.

In the lid structure of the above prior art air bag system, however, for example, the following disadvantage encountered: because the lid-turning center line is defined in the widthwise direction of the vehicle, the free end the lid, when it is opened, does not equally abut against the inner surface of the front windowshield which is relative to a line extending in the widthwise direction the vehicle, which may result in a localized load being applied to the lid to cause a deformation of the lid.

SUMMARY OF THE INVENTION

Accordingly, it is an object of the present invention to prevent a localized load from being applied to a lid covering an upper surface of the instrument panel by permitting the free end of the lid to abut uniformly against the inner surface of the front windowshield when an air bag spreads to open the lid.

To achieve the above object, according to the present invention, there is provided a lid structure in an air bag system in which an air bag stored in an instrument panel expands and spread between an upper surface of the instrument panel and a front windowshield while opening a lid mounted on the upper surface of the instrument panel upon colliding of a vehicle, wherein a lid-turning center line is provided at a front edge side of the lid, and the lid is provided at a rear edge side thereof with a free end which is adapted to abut against the front windowshield when the lid is opened, a relative position, in a longitudinal direction of the vehicle, of the lid-turning center line to the free end of the lid being determined such that the free end can abut over a widthwise entire length thereof against the front windowshield substantially concurrently.

With the above construction, when the lid mounted over the opening in the upper portion of the instrument panel is folded along the turning center line at the front edge side and opened upwardly by expansion of the air bag mounted within the instrument panel upon colliding of the vehicle, the free end of the lid at its rear edge side abuts against the inner surface of the front windowshield substantially concurrently over the widthwise entire length of the free end. As a result, a localized load is prevented from being applied to the lid to cause a deformation or breaking of the lid. This ensures that the air bag can more reliably spread into the compartment.

As an example of definite means for allowing the free end of the lid to abut against the inner surface of the front windowshield substantially concurrently in this manner, it is proposed that the lid-turning central line set substantially parallel to a widthwise line of the front windowshield and the free end of the lid is in its closed position set substantially parallel to a line extending in the widthwise direction of the vehicle, or the lid-turning center line is set substantially parallel to the line extending in the widthwise direction of the vehicle and the free end of the lid is in its closed position set substantially symmetrical to the widthwise line of the front windowshield with respect to the turning center line.

The above and other objects, features and advantages the invention will become apparent from reading the following description of preferred embodiments, taken in conjunction with the accompanying drawings.

BRIEF DESCRIPTION OF THE DRAWINGS

FIGS. 1 to 8 illustrate a first embodiment of the present invention, wherein

DESCRIPTION OF THE PREFERRED EMBODIMENTS

The present invention will now be described by way of embodiments in connection with the accompanying drawings.

Figure 1:
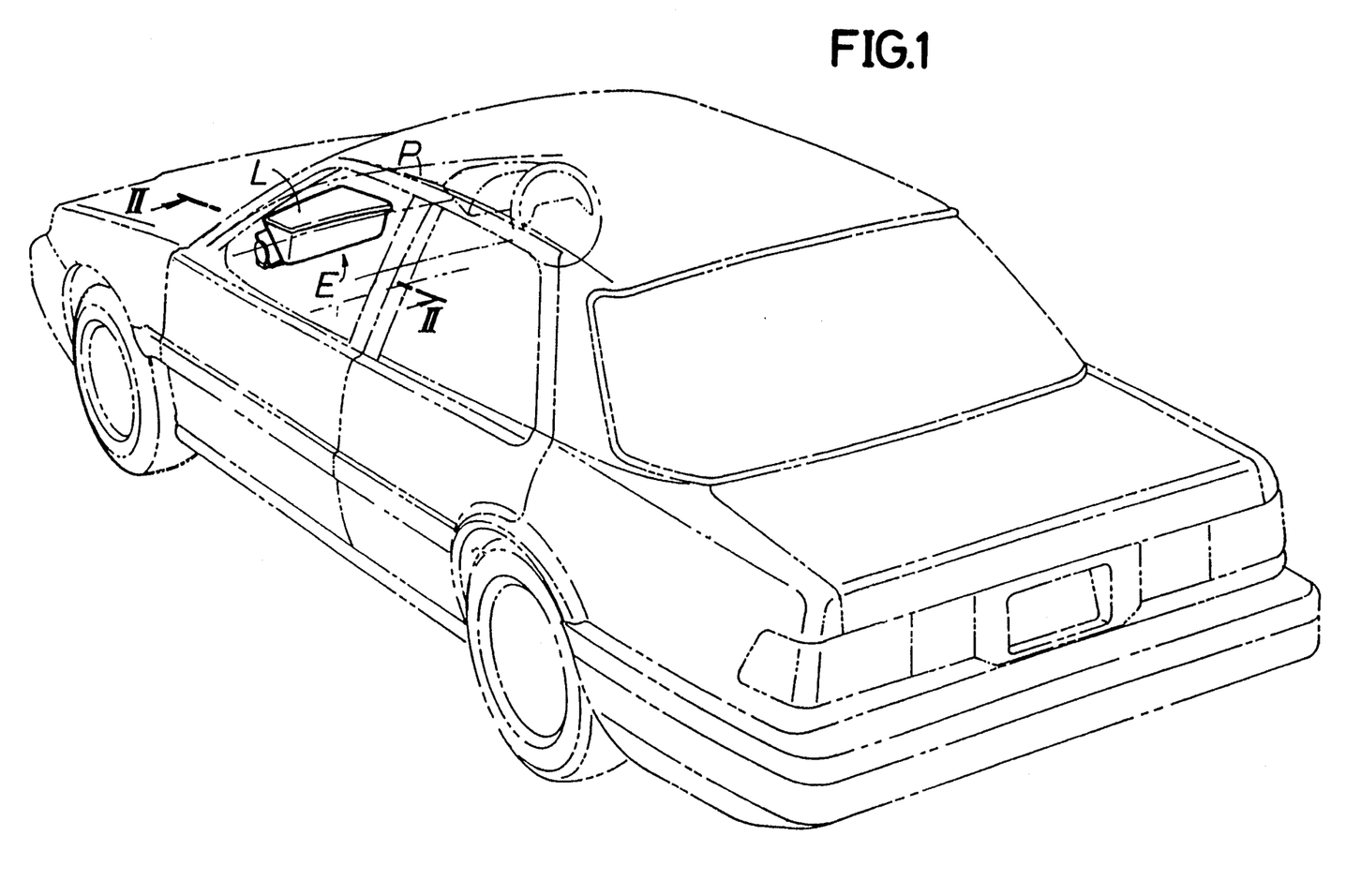
FIG. 1 is a perspective view of an entire vehicle equipped with an air bag system.

Referring to FIG. 1, an air bag system E is mounted within an instrument panel P located forwardly of an assistant driver's seat in a vehicle and is adapted to spread into a compartment while opening a lid L provided on an upper surface of the instrument panel P, thereby holding an occupant of the assistant driver's seat to protect him or her from a shock due to a secondary collision.

As shown in FIGS. 2 to 6, the air bag system E comprises a cylindrical inflator 1 which is ignited upon colliding of the vehicle to produce a high pressure gas, a lower retainer case 2 for supporting at a lower end thereof the inflator 1, an upper retainer case 3 coupled to the lower retainer case 2, and an air bag 4 stored within the retainer cases 2 and 3. An opening in an upper surface of the upper retainer case 3 is covered with the lid L forming a portion of the upper surface of the instrument panel P.

Figure 2:
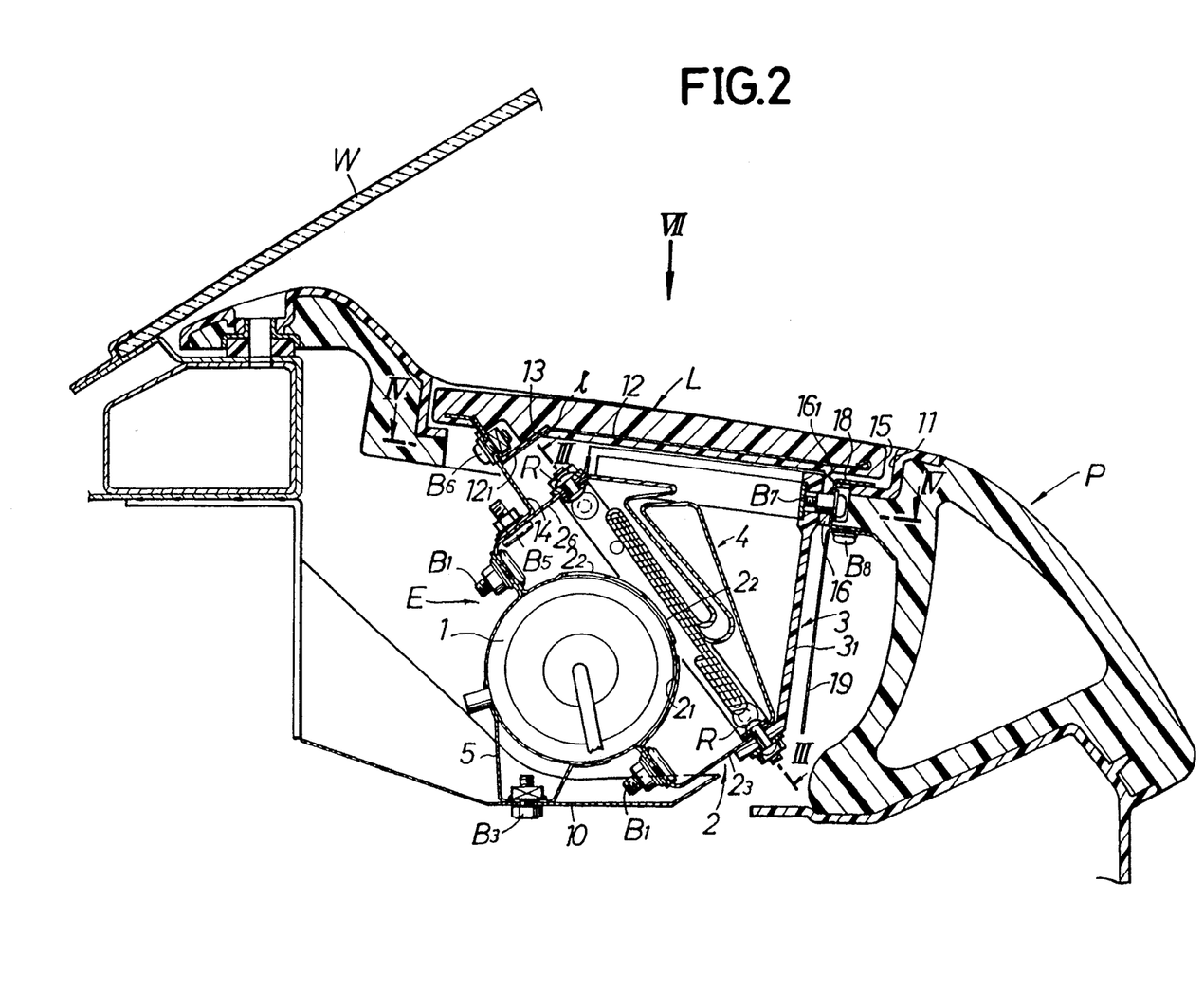
FIG. 2 is a sectional view taken along a line II—II in FIG. 1.
Figure 3:
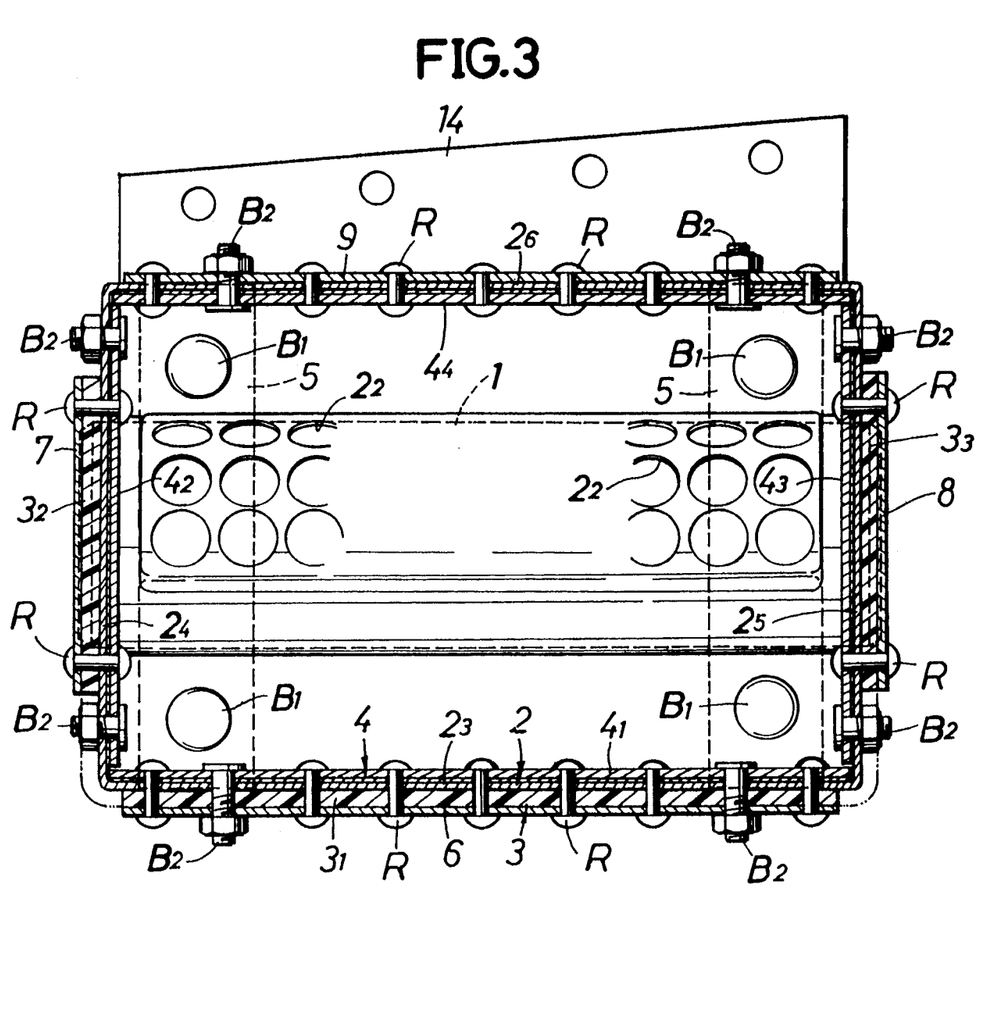
FIG. 3 is a sectional view taken along a line III—III in FIG. 2.
Figure 4:
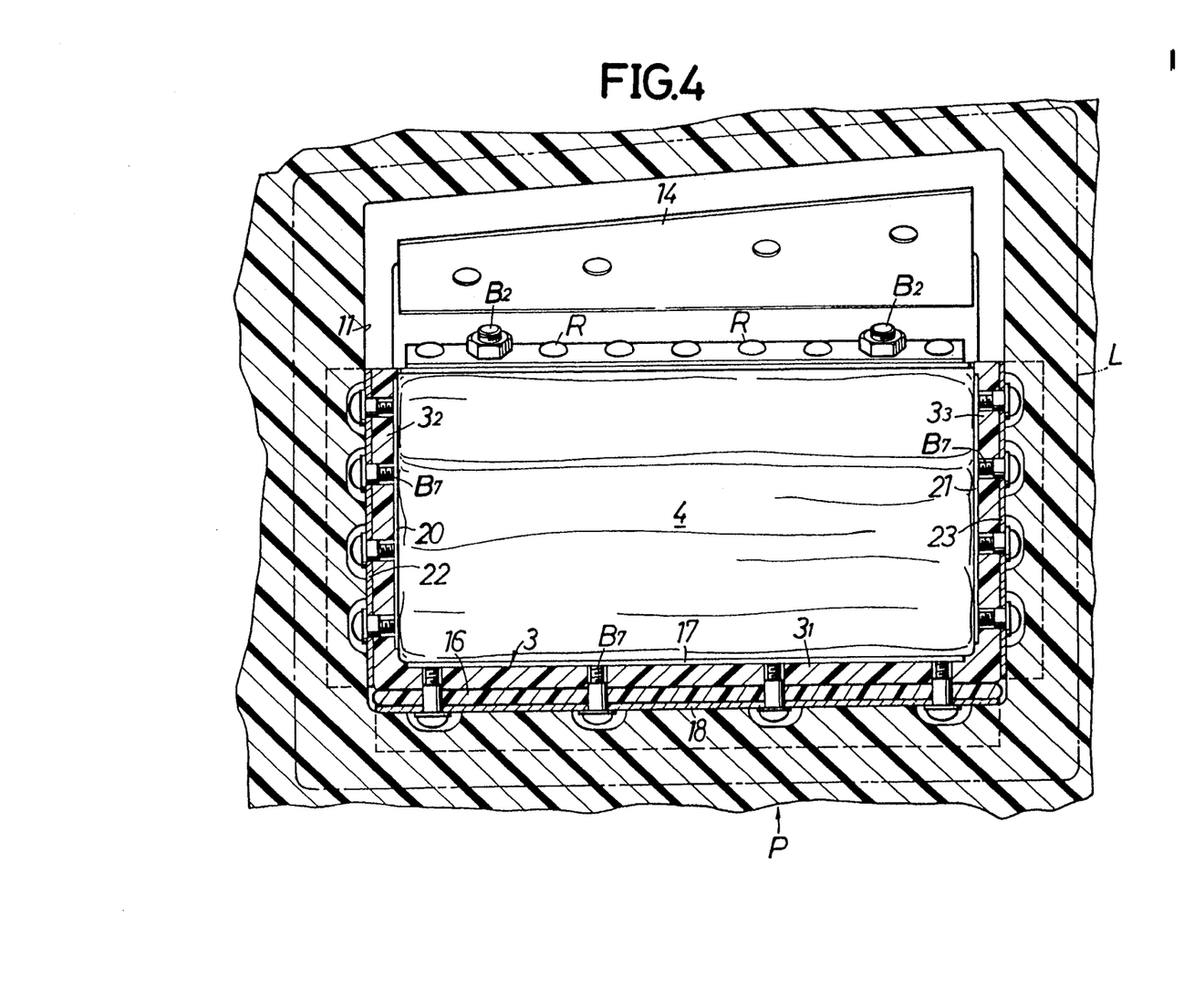
FIG. 4 is a sectional view taken along a line IV—IV in FIG. 2.
Figure 5:
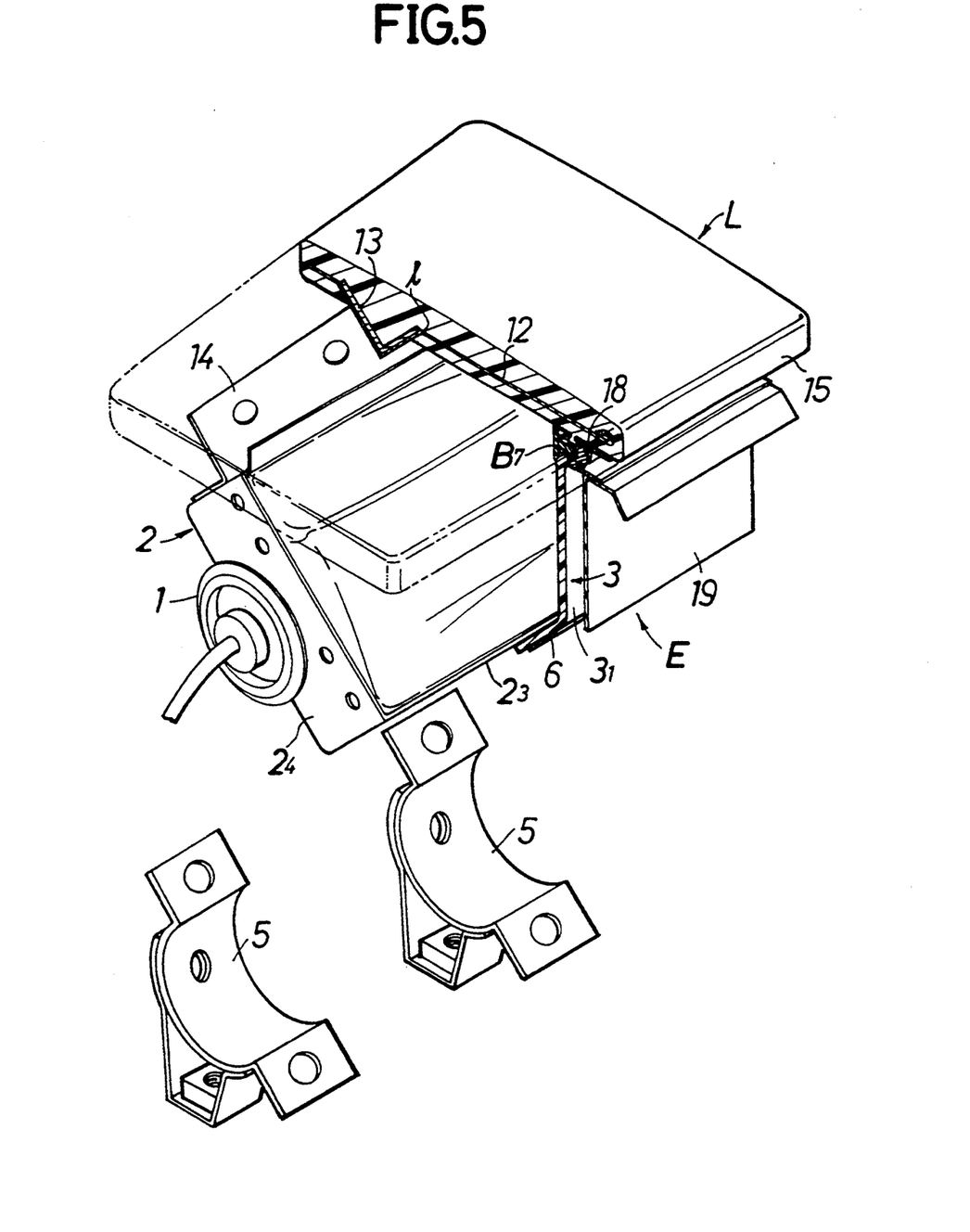
FIG. 5 is a perspective view of the entire air bag system.
Figure 6:
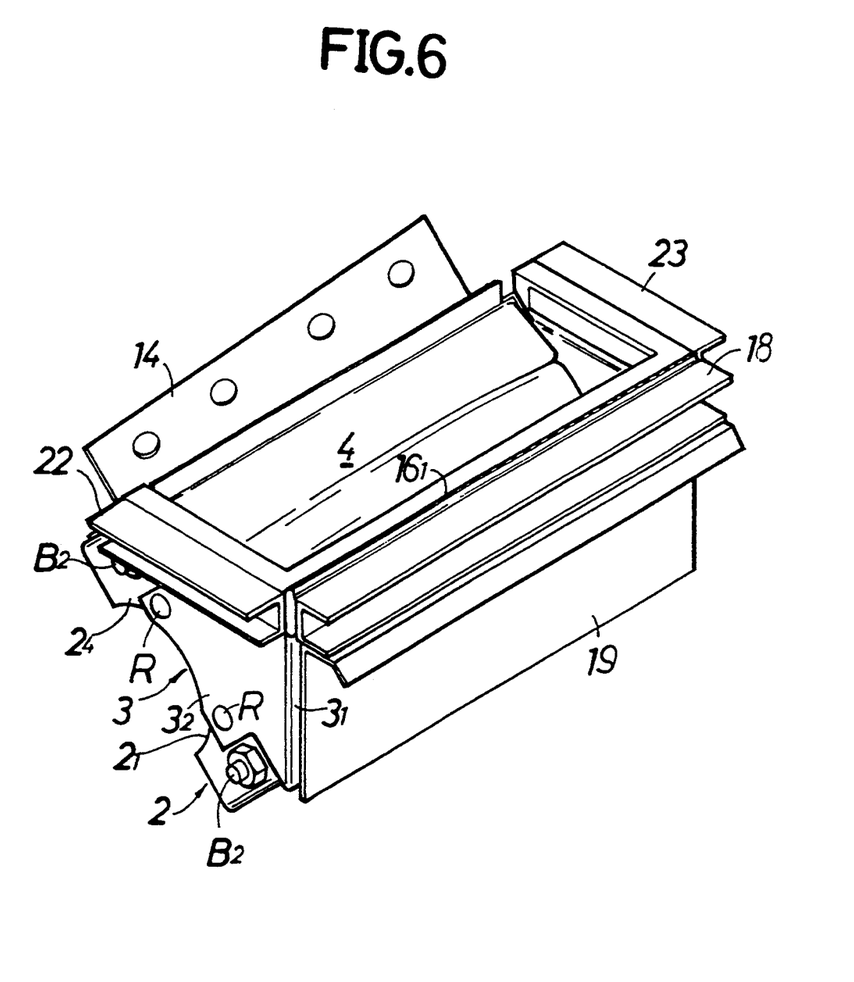
FIG. 6 is a perspective view of a retainer portion of the air bag system.

The lower retainer case 2 is formed as a box made of metal. The inflator 1 which is fitted in a semi-circular recess $2_1$ provided in a lower surface of the retainer case 2, is sandwiched between the recess $2_1$, two mounting brackets 5 and is fixed to the lower retainer case 2 by bolts B1. A large number of gas ejecting holes made in the inflator 1 are opposed to a large number of communication holes $2_2$ made in the recess $2_1$ of the lower retainer case 2, so that a high pressure gas produced by the inflator 1 is supplied to an inside of the lower retainer case 2 through the communication holes $2_2$. As can be seen from FIGS. 3 and 5, the upper retainer case 3 coupled to an upper portion of the lower retainer case 2 is formed of synthetic resin into a U-shape as viewed in a plane, with a rear wall $3_1$ and left and right sidewalls $3_2$ and $3_3$ thereof being fixed to a rear wall $2_3$ and left and right sidewalls $2_4$ and $2_5$ of the lower retainer case 2, respectively. In this case, backings $4_1$, $4_2$ and $4_3$ and reinforcing patches 6, 7 and 8 for reinforcing three sides of a base of the air bag 4 are tightened together, by rivets R and bolts B2, on inner surfaces of the rear wall $2_3$ and the sidewalls $2_4$ and $2_5$ of the lower retainer case 2 and outer surfaces of the rear wall $3_1$ and sidewalls $3_2$ and $3_3$ of the upper retainer case 3, respectively, and remainder backing $4_4$ and patch 9 are tightened together on inner and outer surfaces of a front wall $2_6$ of the lower retainer case 2 by rivets R and bolts B2. The retainer cases 2 and 3 with the inflator 1 and the air bag 4 mounted therein in the above manner is fixed, by bolts B3, to an upper surface of a cross member 10, which connects left and right front pillars of the vehicle, through the mounting bracket 5 mounted to the retainer case 2.

The lid L comprises a plate formed of synthetic resin such as urethane and is fitted in an opening 11 defined in the upper surface of the instrument panel P to form a portion of the instrument panel P. A reinforcing plate 12 made of aluminum is embedded in the lid L, and an angled reinforcing member 13 is overlapped, in a widthwise direction of the vehicle, with an upper surface of a stepped portion $12_1$ formed by downwardly bending a front portion of the reinforcing plate 12 at an obtuse angle. The stepped portion $12_1$ of the reinforcing plate 12 is exposed to a lower surface of the lid L and at such exposed portion, the lid L is secured by bolts B6 to a lid supporting member 14 of an L-shaped section cross which is fixed to the front wall $2_6$ of the lower retainer case 2 by bolts B5. A rear end of the reinforcing member 13 is aligned with a rear end of the stepped portion $12_1$ and provides a folded line l which serves as a center line (which is herein referred to as a lid-turning center line) a rotation as running of the lid L therearound turned when it is opened. As can be seen from FIG. 7, a free end 15 formed at a rear edge of the lid L extends substantially parallel to a line $L_0$ extending in a widthwise direction of the vehicle, whereas a front edge of the lid L and the folded line l provided in the vicinity, of such front edge are inclined relative to the line $l_0$ extending in the widthwise direction of the vehicle. That is, a right-hand end of the folded line l is offset forwardly of the vehicle as compared with a left-hand end of the folded line. This ensures that the folded line l is substantially parallel to a widthwise line $l_1$ of a front windowshield W. It can be seen from FIG. 2 that an upper edge of the front wall $2_6$ of the lower retainer case 2 to which the base of the air bag 2 is fixed is positioned apart from the mounting position of the reinforcing plate 12 for the lid L, so that the air bag 4 will not be damaged even if a fracture is produced in the exposed portion of the reinforcing plate 12 made of aluminum upon opening of the lid L.

A leg 16 is projectingly provided in the vicinity of the free end 15 located at the rear edge of the lid L to extend widthwisely of the vehicle along a lower surface of the free end 15. As can be seen from both of FIGS. 4 and 6, the leg 16 is tightened, together with the reinforcing plate 17 and the reinforcing bracket 18 of the U-shaped section, to an upper edge of the rear portion of the upper retainer case 3 by bolts B7, and the reinforcing bracket 18 is fitted and fixed to an edge of the opening 11 in the instrument panel P in which the lid L is fitted. A support plate 19 of an L-shaped cross-section is secured to a lower surface of the reinforcing bracket 18 by bolts B8, so that when the air bag 4 is expanded, the upper retainer case 3 made of synthetic resin is prevented from being urged outwardly and deformed by a pressure resulting from such expansion. Reinforcing plates 20 and 21 and reinforcing brackets 22 and 23 of a U-shaped cross-section are also tightened together to the left and right sidewalls $3_2$ and $3_3$ of the upper retainer case 3 by bolts B7, the reinforcing brackets 22 and 23 being fitted to the edge of the opening 11 of the instrument panel P. The leg 16 of the lid L has a reduced-thickness portion $16_1$ formed by cutting (see FIG. 2). The thickness of the reduced-thickness portion $16_1$ is gradually reduced in the outward direction of the vehicle, i.e., as the distance between the folded line l of the lid L and the free end 15 is reduced. If the lower surface of the lid L is urged by the expanding pressure of the air bag disposed within the retainer cases 2 and 3, the lid L cut away at the reduced-thickness portion $16_1$ is pivoted or turned upwardly about the folded line l.

Description will now be made of the operation of the embodiment of the present invention having the above-described construction.

If a collision of the vehicle is sensed, the inflator 1 is ignited to produce a high pressure gas which is supplied to the insides of the lower and upper retainer cases 2 and 3 to expand the folded air bag 4. When the expansion of the air bag 4 causes a pressure to be applied to the lower surface of the lid L, the reduced-thickness portion $16_1$ of the leg 16 provided at the rear edge of the lid L is broken. At this time, the reduced-thickness portion $16_1$ is concurrently broken over the entire length thereof, because it is formed thinner, so that breakage of an outer portion of the portion 16, is easy, and the force applied by the expansion of the air bag 4 is gradually smaller in the outer portion of the reduced thickness portion $16_1$ at which the distance between the folded line 1 and the reduced-thickness portion $16_1$ is smaller.

Figure 7:
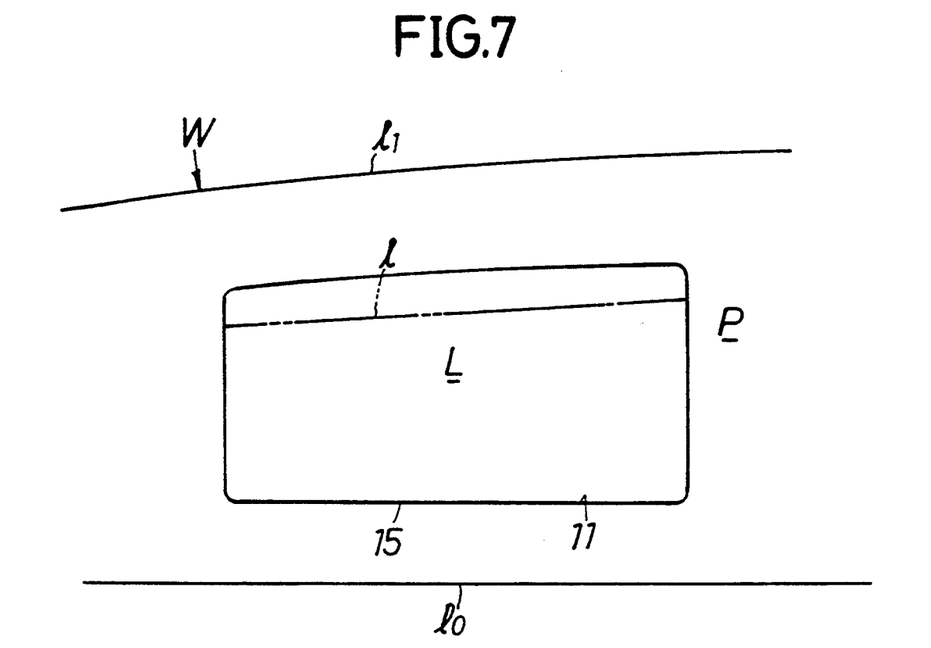
FIG. 7 is a diagram taken in a direction of an arrow VII in FIG. 2.
Figure 8:
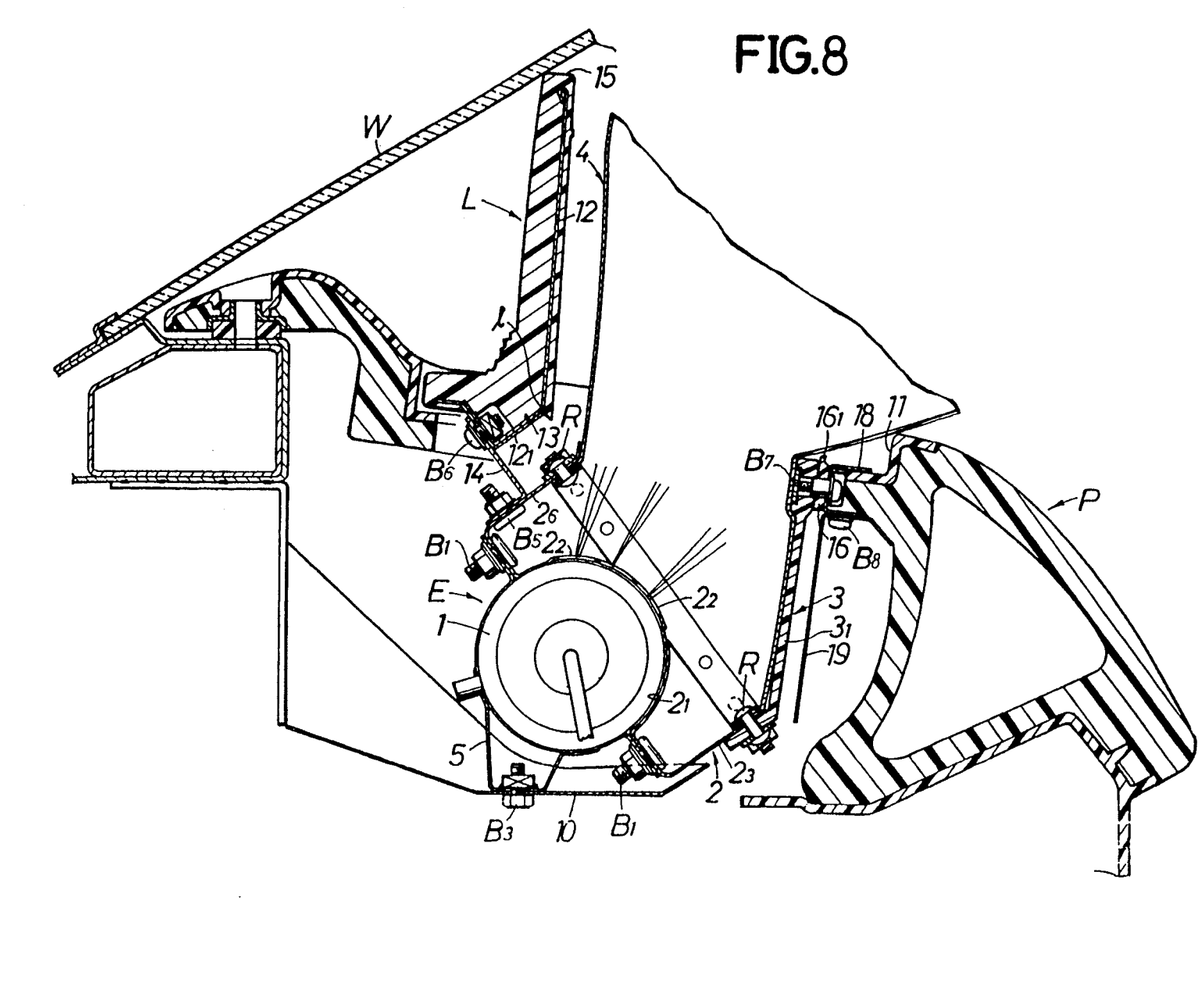
FIG. 8 is a sectional view similar to FIG. 2, but illustrating an air bag as being expanded.

If the lid L is opened in the above manner, the free end 15 provided at the rear edge side of the lid L is pivoted or turned upwardly about the folded line 1 provided at the front edge side, but the free end 15 of the lid L abuts against an inner surface of the front windowshield W substantially concurrently with a substantially uniform pressure over the entire length thereof, as shown in FIG. 8, because the folded line 1 is provided substantially parallel to the widthwise line $l_1$ of the front windowshield W, as shown in FIG. 7. This ensures that any deformation or breaking of the lid L is prevented and hence, the air bag 4 can smoothly spread through the opening 11 in the instrument panel P opened by the lid L.

Figure 9:
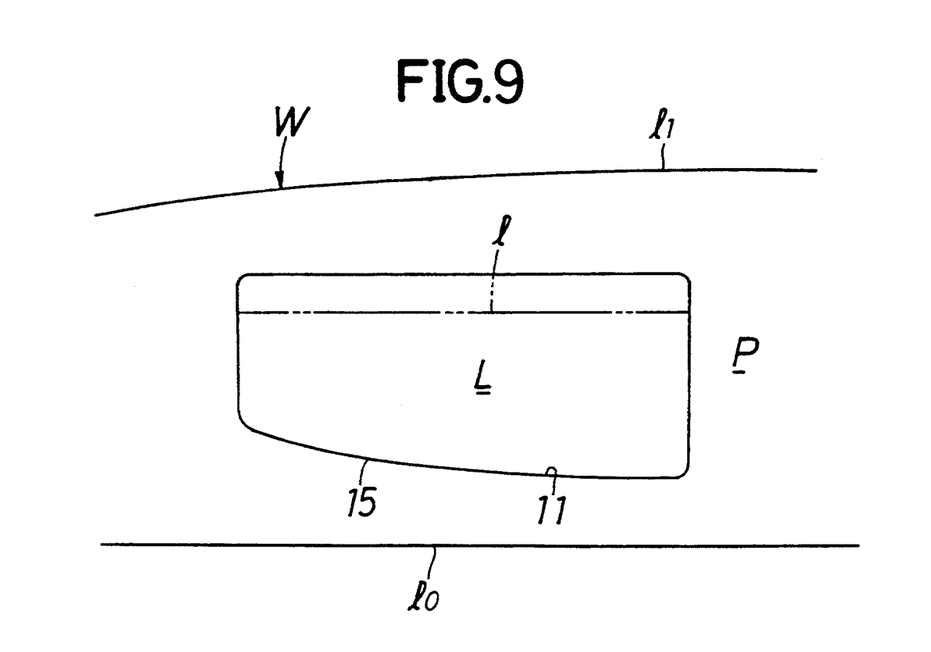
FIG. 9 is a diagram similar to FIG. 7, but illustrating a second embodiment of the present invention.

FIG. 9 illustrates a second embodiment of the present invention which is different, in positional relationship between the folded line 1 and the free end 15 of the lid L, from the previously described embodiment. More specifically, the folded line 1 in this embodiment is set substantially parallel to the line $l_0$ extending in the widthwise direction of the vehicle, and the free end 15 is formed substantially symmetrical to the widthwise line $l_1$ of the front windshield W with respect to the folded line 1. Therefore, the distance between the folded line 1 and the front windowshield W is set larger on the right side (as viewed in FIG. 9) on which the longitudinal width of the lid L is wider, while the distance between the folded line 1 and the front windowshield W is smaller on the left side (as viewed in FIG. 9) on which the longitudinal width of the lid L is narrower. Therefore, as in the previously-described first embodiment, the free end 15 of the lid L is permitted to abut against the inner surface of the front windowshield W with a substantially uniform pressure over the entire length thereof.

It should be noted that in place of pivoting or turning the lid L about the folded line 1, the front edge of the lid L may be pivotally supported on the instrument panel P by a hinge, so that the lid L can be pivotally moved or turned about the hinge. In addition, the inflator 1 is not limited to one using a high pressure gas produced by burning of a propellant, and it is possible to use pressure gas contained in a bank or cylinder.

What is claimed is:

1. A lid structure in an air bag system in which an air bag stored in an instrument panel is expanded and spread between a top surface of the instrument panel and a front windshield inclined relative to the width of the vehicle upon colliding of a vehicle, said lid structure comprising:

a lid mounted on the top surface of the instrument panel;

a lid-turning center line provided at a front edge side of the lid; and a rear edge side of the lid provided with a free end which is to abut against the front windshield when the lid is opened, a relative position, in a longitudinal direction of the vehicle, of the lid-turning center line and the free end being determined so that the lid-turning center line and the free end are not parallel to each other in a widthwise direction of the vehicle so as to bring the free end into abutment against the front windshield substantially concurrently along a widthwise entire length of the free end.

2. A lid structure in an air bag system according to claim 1, wherein the lid-turning center line is substantially parallel to a line extending in a widthwise direction of the vehicle, and the free end of the lid is set, in its closed position substantially symmetrical to a widthwise line of the windshield with respect to the lid-turning center line.

3. A lid structure in an air bag system according to claim 1, wherein the lid has left and right side edges which are formed such that one of the left and right side edges which is closer to a widthwise center of the vehicle is longer than the other of the left and right side edges.

4. A lid structure in an air bag system according to claim 1, wherein that portion of the front windshield against which the free end of the lid comes to abut, is inclined relative to a line extending in the widthwise direction of the vehicle.

5. A lid structure in an air bag system for a vehicle, the air bag system including an air bag which is stored in an instrument panel and is, upon collision of the vehicle, expanded and spread between a top surface of the instrument panel and a windshield of the vehicle, said lid structure comprising a lid mounted on the top surface of the instrument panel at a position behind a portion of said windshield which is inclined at an angle to a widthwise line that extends perpendicularly to a longitudinal direction of the vehicle, said lid comprising:

a front edge;

a rear edge as a free end; and a lid-turning center line near said front edge;

one of said free end and said lid-turning center line extending not parallel to said widthwise line.

6. A lid structure in an air bag system according to claim 5, wherein said free end extends parallel to said widthwise line of the vehicle and said lid-turning center line extends parallel to said portion of the windshield.

7. A lid structure in an air bag system according to claim 5, wherein said lid-turning center line extends parallel to said widthwise line of the vehicle and said free end extends symmetrically to a widthwise line of said portion of the windshield with respect to the lid-turning center line.

8. A lid structure in an air bag system according to claim 1, wherein the ratio of a distance from the lid-turning center line to the free end on a right side of the lid with respect to a distance from the lid-turning center line to the windshield on the right side is set equal to the ratio of a distance from the lid-turning center line to the free end on a left side of the lid with respect to a distance from the lid-turning center line to the windshield on the left side.

* * * * *

UNITED STATES PATENT AND TRADEMARK OFFICE
CERTIFICATE OF CORRECTION

PATENT NO.  : 5,378,012
DATED       : January 3, 1995
INVENTOR(S) : SEKI et al.

It is certified that error appears in the above-identified patent and that said Letters Patent is hereby corrected as shown below:

On the cover page, Item [75], the first inventor's name "Kazuhiko Seiki" should be --Kazuhiro Seki--.

Signed and Sealed this

Eighteenth Day of April, 1995

Attest:

BRUCE LEHMAN

Attesting Officer

*Commissioner of Patents and Trademarks*